US012713328B2

(12) United States Patent
Raghavan et al.

(10) Patent No.: US 12,713,328 B2
(45) Date of Patent: Aug. 18, 2026

(54) CONNECTION RESTRICTION BETWEEN NON-TERRESTRIAL BASE STATION AND IN-THE-SKY COMMUNICATION DEVICE

(71) Applicant: RAKUTEN MOBILE, INC., Tokyo (JP)

(72) Inventors: Sathyadeep Raghavan, Tokyo (JP); Pankaj Shete, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 438 days.

(21) Appl. No.: 18/270,142

(22) PCT Filed: Mar. 28, 2022

(86) PCT No.: PCT/JP2022/015123
§ 371 (c)(1),
(2) Date: Jun. 28, 2023

(87) PCT Pub. No.: WO2023/187924
PCT Pub. Date: Oct. 5, 2023

(65) Prior Publication Data

US 2024/0406841 A1 Dec. 5, 2024

(51) Int. Cl.

*H04W 48/02* (2009.01)
*H04W 64/00* (2009.01)
*H04W 84/06* (2009.01)

(52) U.S. Cl.

CPC ........... *H04W 48/02* (2013.01); *H04W 64/00* (2013.01); *H04W 84/06* (2013.01)

(58) Field of Classification Search

CPC ..... H04W 48/02; H04W 64/00; H04W 84/06; H04W 48/04; H04W 24/08; H04B 7/18502; H04B 7/18506

See application file for complete search history.

(56) References Cited

U.S. PATENT DOCUMENTS 11,963,237 B2 * 4/2024 Mahalingam ..... H04W 74/0841
2009/0225706 A1 * 9/2009 Ramachandran .... H04B 7/2606 370/329

(Continued)

FOREIGN PATENT DOCUMENTS

JP 2010-278886 A 12/2010
JP 2013-197871 A 9/2013

(Continued)

OTHER PUBLICATIONS

International Search Report for PCT/JP2022/015123 dated Jun. 28, 2022.

(Continued)

*Primary Examiner* — Habte Mered
(74) *Attorney, Agent, or Firm* — Sughrue Mion, PLLC

(57) ABSTRACT

A communication control apparatus has at least one processor that performs: by an in-the-sky communication device detection unit, detecting an in-the-sky communication device located above the ground; and by a connection restriction unit, restricting the connection of the in-the-sky communication device with a flying non-terrestrial base station that provides a non-terrestrial communication cell to a communication device. The in-the-sky communication device is a communication device in a flying aircraft. The in-the-sky communication device detection unit is provided in the in-the-sky communication device and detects itself as the in-the-sky communication device based on the altitude detected by a positioning sensor provided in the in-the-sky communication device. The connection restriction unit is provided in the in-the-sky communication device and restricts the transmission of connection request from the in-the-sky communication device to the non-terrestrial base station.

17 Claims, 6 Drawing Sheets

(56) References Cited

U.S. PATENT DOCUMENTS

| | | | | |
|---|---|---|---|---|
| 2018/0279325 | A1* | 9/2018 | Huang | H04W 72/54 |
| 2021/0029658 | A1 | 1/2021 | Mahalingam et al. | |
| 2021/0195604 | A1* | 6/2021 | Yasukawa | H04W 16/14 |
| 2021/0250971 | A1* | 8/2021 | Yamada | H04L 5/14 |
| 2021/0385879 | A1* | 12/2021 | Mahalingam | H04W 74/0866 |
| 2022/0232465 | A1* | 7/2022 | Tsuda | H04W 76/10 |
| 2024/0056925 | A1* | 2/2024 | Maaref | H04W 36/0022 |
| 2024/0064598 | A1* | 2/2024 | Bergström | H04W 36/362 |
| 2024/0259917 | A1* | 8/2024 | Ma | H04L 27/261 |
| 2024/0259976 | A1* | 8/2024 | Kurita | H04W 88/04 |
| 2025/0048291 | A1* | 2/2025 | Shin | H04W 56/0045 |
| 2025/0193768 | A1* | 6/2025 | Karapantelakis | H04W 40/18 |

FOREIGN PATENT DOCUMENTS

| | | | |
|---|---|---|---|
| JP | 2022-506120 | A | 1/2022 |
| WO | 2019/101837 | A1 | 5/2019 |

OTHER PUBLICATIONS

Written Opinion for PCT/JP2022/015123 dated Jun. 28, 2022.

Tuğçe Bilen, et al., "Aeronautical Networks for In-Flight Connectivity: A Tutorial of the State-of-the-Art and Survey of Research Challenges", IEEEAccess, 2022, vol. 10, DOI10.1109, pp. 20053-20079 (27 pages total).

* cited by examiner

CONNECTION RESTRICTION BETWEEN NON-TERRESTRIAL BASE STATION AND IN-THE-SKY COMMUNICATION DEVICE

CROSS REFERENCE TO RELATED APPLICATIONS

This application is a National Stage of International Application No. PCT/JP2022/015123 filed Mar. 28, 2022.

BACKGROUND OF THE INVENTION

1. Field of the Invention

The present disclosure relates to communication control technology in communication system.

2. Description of the Related Art

The number, types, and applications of wireless communication devices, represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

Mobile communication networks for mobile or portable communication devices such as smartphones and cell phones (hereinafter collectively referred to as communication device(s)) are usually constructed by communication cells (hereinafter referred to as terrestrial communication cell(s)) provided by base stations installed on the ground (hereinafter referred to as terrestrial base station(s)). However, in some areas, it was difficult to install a sufficient number of terrestrial base stations for various reasons, resulting in a relatively low quality of mobile communications.

In order to solve the problem of the disparity in mobile communication quality among different regions and the so-called "out-of-range" problem, where mobile communication devices cannot communicate in some regions, non-terrestrial networks (NTN) have been considered. In NTN, communication satellites or unmanned aircrafts flying in outer space or the atmosphere such as the stratosphere, are used as base stations (hereinafter referred to as non-terrestrial base station(s), and especially communication satellites are referred to as satellite base station(s)). The non-terrestrial base station provides a communication cell on the ground (hereinafter referred to as non-terrestrial communication cell(s), and especially communication cells provided by communication satellites are referred to as satellite communication cell(s)). A communication device in a non-terrestrial communication cell communicates with a non-terrestrial base station directly or indirectly via other communication devices. By providing non-terrestrial communication cells in areas where terrestrial communication cells are not sufficient, the quality of mobile communication in such areas can be improved.

Patent Literature 1: JP-A-2010-278886

SUMMARY OF THE INVENTION

The inventor recognized the possibility that the communication quality of a non-terrestrial network may be affected by communication devices used by passengers and others in an aircraft. A communication device in an aircraft (hereinafter referred to as in-flight communication device or in-flight UE, and a communication device located above the ground is generally referred to as in-the-sky communication device or in-the-sky UE) is located closer to a non-terrestrial base station such as communication satellite than a communication device on the ground (hereinafter referred to as ground communication device or ground UE), so it is more likely to attempt to connect to the non-terrestrial base station. However, because an aircraft fly at high speed in the sky, it passes through the satellite communication cell provided by the communication satellite in a very short time. Therefore, in-flight communication devices are practically unable to communicate even if they connect to the communications satellite. On the other hand, if as many as several hundred of in-flight communication devices in one aircraft attempt to connect to the communication satellite at all once, the limited communication resources of the communication satellite are wasted for processing those signals.

The present disclosure was made in view of these circumstances, and its purpose is to provide a communication control apparatus and the like that can reduce the consumption of communication resources of a non-terrestrial base station by an in-the-sky communication device located above the ground.

In order to solve the above problem, a communication control apparatus in a certain aspect of the present disclosure comprises at least one processor that performs: by an in-the-sky communication device detection unit, detecting an in-the-sky communication device located above the ground; and by a connection restriction unit, restricting the connection of the in-the-sky communication device with a flying non-terrestrial base station that provides a non-terrestrial communication cell to a communication device.

According to this aspect, the connection between the non-terrestrial base station and the in-the-sky communication device is restricted, thereby reducing the consumption of communication resources of the non-terrestrial base station by the in-the-sky communication device.

Another aspect of the present disclosure is a communication control method. The communication control method comprises: detecting an in-the-sky communication device located above the ground; and restricting the connection of the in-the-sky communication device with a flying non-terrestrial base station that provides a non-terrestrial communication cell to a communication device.

Further another aspect of the present disclosure is a computer-readable medium. The computer-readable medium stores a communication control program causing a computer to perform: detecting an in-the-sky communication device located above the ground; and restricting the connection of the in-the-sky communication device with a flying non-terrestrial base station that provides a non-terrestrial communication cell to a communication device.

In addition, any combination of the above components, and any conversion of the expression of the present disclosure among methods, devices, systems, recording media, computer programs and the like are also encompassed within this disclosure.

According to the present disclosure, the consumption of communication resources of a non-terrestrial base station by an in-the-sky communication device located above the ground can be reduced.

DETAILED DESCRIPTION OF THE INVENTION

Figure 1:
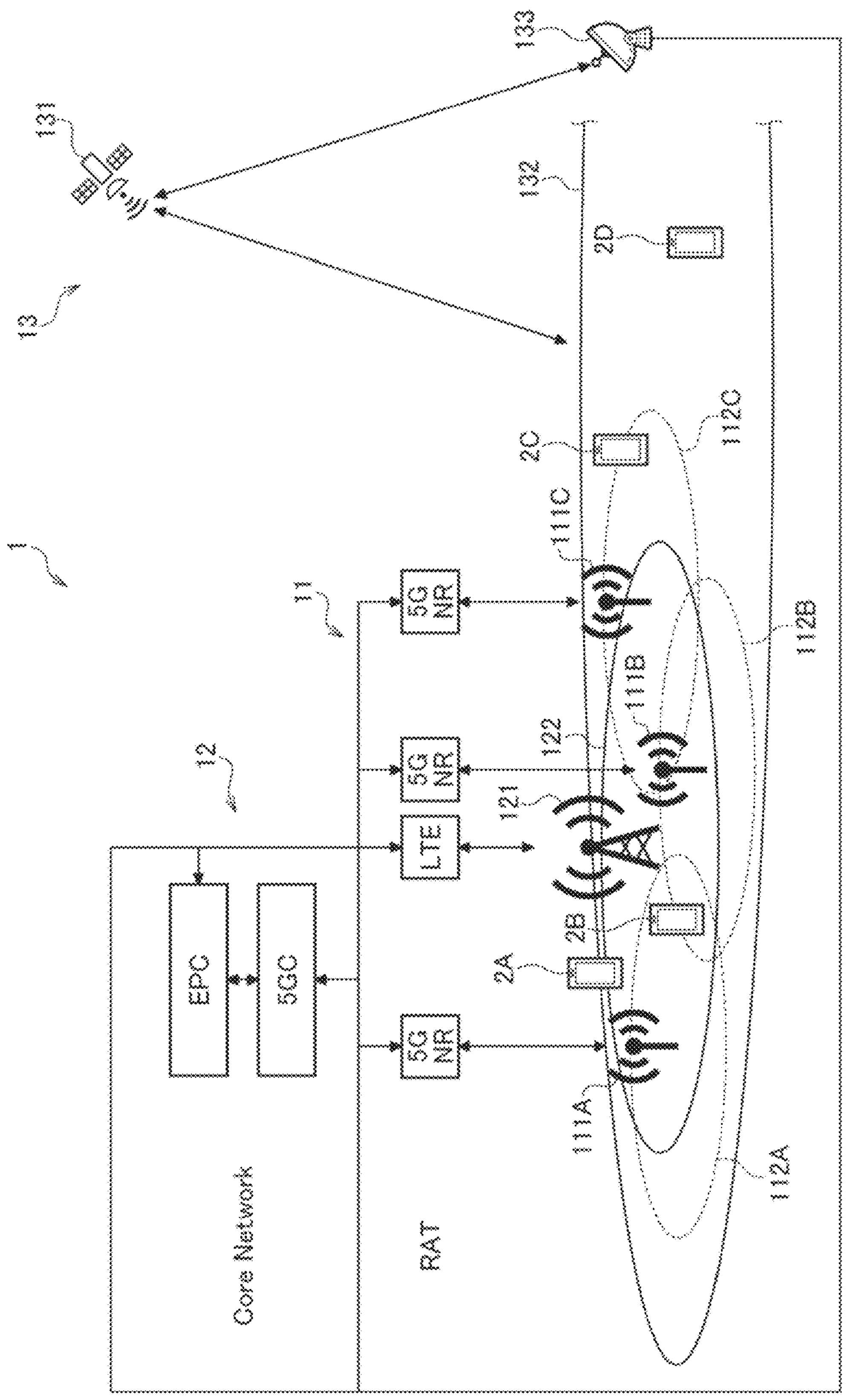
FIG. 1 schematically shows the overview of a wireless communication system to which the communication control apparatus is applied.

FIG. 1 schematically shows an overview of a wireless communication system 1 to which the communication control apparatus according to one embodiment of the present disclosure is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is for satellite communication via communication satellite 131. Although not shown in the figure, the wireless communication system 1 may include wireless communication networks of a generation prior to 4G, a generation later than 5G (e.g. 6G), or any wireless communication networks that are not associated with generations, such as Wi-Fi (registered trademark).

The 5G wireless communication system 11 may include a plurality of 5G base stations 111A, 111B and 111C (hereinafter collectively referred to as 5G base station 111) installed on the ground capable of communicating by 5G NR with communication devices or communication devices 2A, 2B, 2C and 2D (hereinafter collectively referred to as communication device(s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter collectively referred to as 5G cell 112 or cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication devices 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 comprises a plurality of 4G base stations 121 (only one of them is shown in FIG. 1) installed on the ground that can communicate with the communication device 2 by LTE or LTE-Advanced. The base station 121 in 4G is referred to as eNodeB (eNB). Similar to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication devices 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality etc., under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as non-terrestrial base stations. The communication satellites 131 are low-earth-orbit satellites flying in low-earth-orbit outer space of 500 to 700 km above the ground. Similar to 5G base station 111 and 4G base station 121, the communication range or support range of each communication satellite 131 is also called a cell and is shown as 132. Thus, a communication satellite 131 as a non-terrestrial base station provides a satellite communication cell 132 as a non-terrestrial communication cell onto the ground. Communication device 2 on the ground can conduct satellite communication when it is inside the satellite communication cell 132. Similar to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft etc. with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, the communication device 2 may not be equipped with any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and the 4G base station 121 as terrestrial base stations that constitute the terrestrial network (TN). In this way, the gateway 133 connects the non-terrestrial network (NTN), which is comprising communication satellites 131, and the terrestrial network TN, which is comprising terrestrial base stations 111 and 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In this way, appropriate coordination is made between different wireless communication systems such as 5G wireless communication system 11, 4G wireless communication system 12, satellite communication system 13 etc. through the gateway 133.

Satellite communication by communication satellites 131 is mainly used for covering areas with no or few terrestrial base stations such as 5G base stations 111 and 4G base stations 121 etc. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D etc. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of about 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of about 500 km to 700 km above the ground as a flying non-terrestrial base station. However, a communication satellite flying in geostationary orbit or other higher orbit in outer space, or an unmanned or manned aircraft flying in stratosphere or other lower (e.g. about 20 km above the ground) atmosphere may be used as a non-terrestrial base station in addition to or instead of the communication satellite 131.

Figure 2:
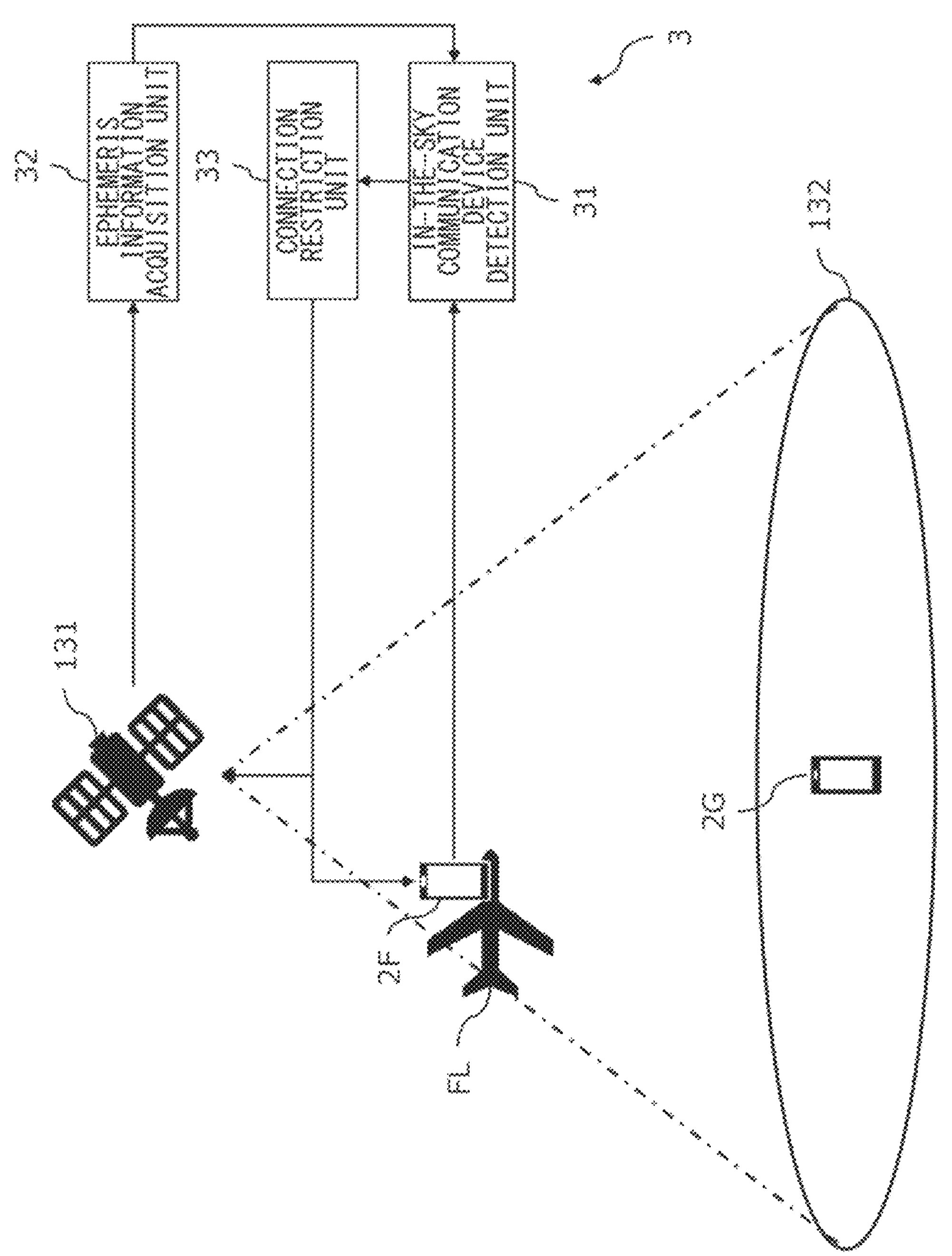
FIG. 2 schematically shows a communication satellite providing a satellite communication cell to a communication device.

FIG. 2 schematically shows the communication satellite 131 as a non-terrestrial base station providing the satellite communication cell 132 as a non-terrestrial communication cell to the communication devices 2F and 2G. The communication device 2F is a communication device used by passengers and others in an aircraft FL flying in the sky, and is hereinafter also referred to as in-flight communication device 2F. The in-flight communication device 2F is an example of a communication device located in the satellite communication cell 132 in the sky above the ground, and is hereinafter also referred to as in-the-sky communication device 2F. The communication device 2G is a communication device located in the satellite communication cell 132 on the ground, and is hereinafter also referred to as ground communication device 2G. Since the in-the-sky communication device 2F and the ground communication device 2G are located in the satellite communication cell 132 in the sky and on the ground respectively, both of them can connect to the communication satellite 131.

Since the in-the-sky communication device 2F is located closer to the communication satellite 131 than the ground communication device 2G, it is more likely to attempt to connect to the communication satellite 131. However, because the aircraft FL fly at high speed in the sky, it passes through the satellite communication cell 132 provided by the communication satellite 131 in a very short time. Therefore, the in-flight communication devices 2F are practically unable to communicate even if they connect to the communications satellite 131. On the other hand, if as many as several hundred of the in-flight communication devices 2F in one aircraft FL attempt to connect to the communication satellite 131 at all once, the limited communication resources of the communication satellite 131 are wasted for processing those signals. Therefore, the connection and/or the communication between the ground communication device 2G and the communication satellite 131 may be prevented by a large number of the in-flight communication devices 2F. In particular, the communication satellite 131 usually has limited available power and/or radio bandwidth compared to the terrestrial base stations 111, 121. As a result of the valuable communication resources being used for unnecessary processes with the in-flight communication devices 2F, the ground communication device 2G may be disconnected from the communication satellite 131. This embodiment provides a communication control apparatus 3 that can reduce such consumption or waste of communication resources of the communication satellite 131 by the in-the-sky communication devices 2F.

The communication control apparatus 3 comprises an in-the-sky communication device detection unit 31 that detects the in-the-sky communication device 2F such as the in-flight communication device 2F, an ephemeris information acquisition unit 32 that acquires ephemeris information of the communication satellite 131, and a connection restriction unit 33 that restricts the connection of the in-the-sky communication device 2F with the communication satellite 131. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Especially in the present embodiment, some or all of functional blocks of the communication control apparatus 3 may be realized in a centralized manner or a distributed manner in computer and/or processor provided in the communication devices 2 (2F etc.), the communication satellite 131, the gateway 133, and the core network such as 5GC and EPC directly or indirectly connected to the gateway 133.

In this embodiment, the first example and the second example will be described. In the first example, each functional block 31-33 of the communication control apparatus 3 is realized mainly on the in-the-sky communication device 2F side. In the second example, each functional block 31-33 of the communication control apparatus 3 is realized mainly on the side of the non-terrestrial network constituted by the communication satellite 131 and/or the gateway 133.

In the first example, the in-the-sky communication device detection unit 31, the ephemeris information acquisition unit 32, and the connection restriction unit 33 are realized in the in-the-sky communication device 2F. The in-the-sky communication device detection unit 31, which is provided in the in-the-sky communication device 2F, detects itself as the in-the-sky communication device 2F based on the altitude detected by a positioning sensor provided in the in-the-sky communication device 2F. The in-the-sky communication device 2F can, for example, use a positioning sensor based on a satellite positioning system etc. such as GPS (Global Positioning System) and GNSS (Global Navigation Satellite System) as the in-the-sky communication device detection unit 31 to acquire its own three-dimensional position information. In this example, the altitude information included in the three-dimensional position information is used in particular.

For example, the in-the-sky communication device detection unit 31 may set an altitude threshold for the altitude of the in-the-sky communication device 2F, and detect the communication device 2 whose altitude is detected to be above this altitude threshold as the in-the-sky communication device 2F. Specifically, when the altitude threshold is, for example, "5,000 m", each communication device 2 recognizes itself as the in-the-sky communication device 2F when the altitude detected by its own positioning sensor is "5,000 m" or higher. The connection restriction unit 33 provided in such an in-the-sky communication device 2F restricts the transmission of connection request from itself (the in-the-sky communication device 2F) to the communication satellite 131. For example, a communication device 2 (connection restriction unit 33) that has recognized itself as an in-the-sky communication device 2F does not send a connection request to the communication satellite 131. As a result of the transmission of connection request from the in-the-sky communication device 2F to the communication satellite 131 being restricted, the connection between the communication satellite 131 and the in-the-sky communication device 2F is restricted, thereby reducing the consumption of communication resources of the communication satellite 131 by the in-the-sky communication device 2F.

In addition to the above, the in-the-sky communication device detection unit 31 provided in the in-the-sky communication device 2F may detect itself as the in-the-sky communication device 2F, when the difference between the altitude information of the communication satellite 131 notified to the in-the-sky communication device 2F by the non-terrestrial network including the communication satellite 131, and the altitude of itself (in-the-sky communication device 2F) detected by the positioning sensor, is less than a predetermined value. Specifically, the ephemeris information acquisition unit 32 provided in the in-the-sky communication device 2F receives broadcast information such as SIB (System Information Block) periodically or non-periodically transmitted to the satellite communication cell 132 by the communication satellite 131, and extracts the ephemeris information of the communication satellite 131 contained in such broadcast information.

The in-the-sky communication device detection unit 31 can recognize the altitude of the communication satellite 131 based on the ephemeris information of the communication satellite 131 obtained by the ephemeris information acquisition unit 32. In this case, the in-the-sky communication device 2F as the in-the-sky communication device detection unit 31 can compare its own altitude by the positioning sensor and the altitude of the communication satellite 131 by the ephemeris information acquisition unit 32. For example, the in-the-sky communication device detection unit 31 may detect itself as the in-the-sky communication device 2F when the altitude difference between the communication satellite 131 and itself (in-the-sky communication device 2F) is less than a predetermined altitude difference threshold. Specifically, when the altitude difference threshold is, for example, "2,000 m" and the altitude of the communication satellite 131 by the ephemeris information acquisition unit 32 is, for example, "10,000 m", each communication device 2 recognizes itself as the in-the-sky communication device 2F for the communication satellite 131 when the altitude detected by its own positioning sensor is more than "8,000 m" and less than "12,000 m". As a result of the connection between the communication satellite 131 and the in-the-sky communication device 2F being restricted by the connection restriction unit 33, consumption of communication resources of the communication satellite 131 by the in-the-sky communication device 2F can be reduced. It should be noted that the altitude information of the communication satellite 131 can also be obtained or calculated through MDT (Minimization of Drive Tests) introduced in 3GPP.

The broadcast information such as SIB periodically or non-periodically transmitted by the non-terrestrial network, may include, in addition to or instead of the ephemeris information and/or the altitude information of the communication satellite 131, altitude range information of communication devices 2 for restricting or allowing their connections. For example, when an altitude range with a lower limit of "8,000 m" and an upper limit of "12,000 m" is included in the broadcast information such as SIB as the altitude range information for restricting connections, an in-the-sky communication device 2F as the in-the-sky communication device detection unit 31 that has received this altitude range information recognizes itself as the in-the-sky communication device 2F for the communication satellite 131, when the altitude by its own positioning sensor is within this altitude range. As a result of the connection between the communication satellite 131 and the in-the-sky communication device 2F being restricted by the connection restriction unit 33, consumption of communication resources of the communication satellite 131 by the in-the-sky communication device 2F can be reduced.

It should be noted that the broadcast information such as SIB does not necessarily have to be broadcasted to the communication device 2 from the communication satellite 131 to be connected by this communication device 2, and may be broadcasted to the communication device 2 from: the other communication satellites 131 that the aircraft FL passed nearby before the communication satellite 131 to be connected; the other communication satellites 131 in the vicinity of the communication satellite 131 to be connected; and/or the terrestrial base stations 111, 121 and/or the gateways 133 etc. if the in-the-sky communication device 2F can receive radio signals from the ground.

Figure 3:
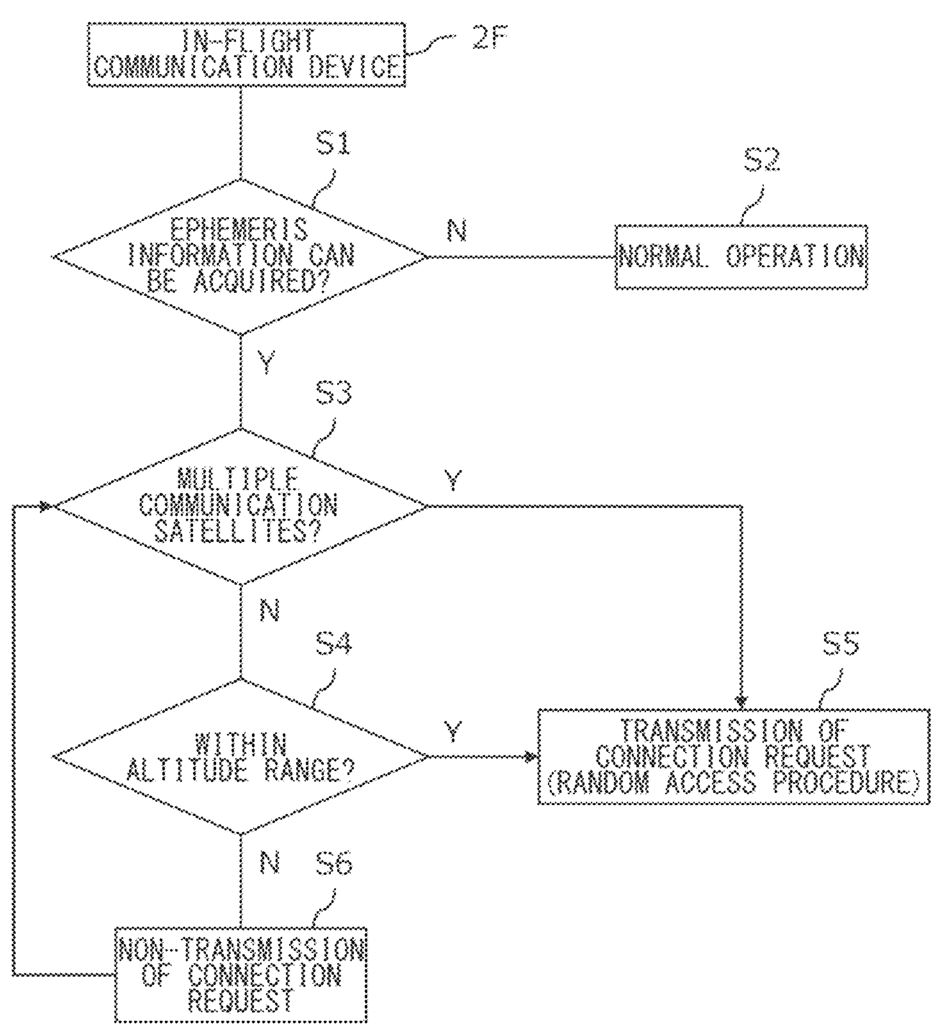
FIG. 3 is a flowchart showing example processes of the first example.

FIG. 3 is a flowchart showing an example of the processes in the first example. "S" in the flowchart description refers to a step or a process. This flowchart mainly shows the processes executed by the in-flight communication device 2F. In S1, the ephemeris information acquisition unit 32 provided in the in-flight communication device 2F determines whether or not the ephemeris information of the communication satellite 131 can be acquired. Specifically, the ephemeris information acquisition unit 32 determines whether or not the ephemeris information of the communication satellite 131 to be connected is included in the broadcast information such as SIB received by the in-flight communication device 2F from the communication satellite 131 to be connected or from other non-terrestrial and/or terrestrial base stations etc. If S1 is determined to be No, the processes proceed to S2 where the in-flight communication device 2F performs the normal connection and/or communication operations similar to the ground communication device 2G. As described above, the in-flight communication device 2F may restrict the transmission of connection request to the communication satellite 131 according to the comparison result of the altitude detected by its own positioning sensor and the predetermined altitude threshold, by not depending on the ephemeris information (altitude information) of the communication satellite 131.

If S1 is determined to be Yes, the processes proceed to S3 where the ephemeris information acquisition unit 32 provided in the in-flight communication device 2F determines whether or not there are multiple communication satellites 131 to which the in-flight communication device 2F can connect. Specifically, the in-flight communication device 2F can recognize the number of non-terrestrial base stations to which it may be able to connect, based on the broadcast information such as SIB received in S1. If S3 is determined to be No, the processes proceed to S4 where the in-the-sky communication device detection unit 31 provided in the in-flight communication device 2F determines whether or not the altitude detected by its own positioning sensor is within the altitude range for allowing connection of the communication satellite 131, which is set in the broadcast information such as SIB received in S1.

If S3 and/or S4 is determined to be Yes, the processes proceed to S5 where the connection restriction unit 33 provided in the in-flight communication device 2F does not restrict the connection between the communication satellite 131 and the in-flight communication device 2F, and the in-flight communication device 2F transmits the connection request to the communication satellite 131 according to the normal random access procedure. If S3 is determined to be Yes, there are multiple communication satellites 131 to which the in-flight communication device 2F can be connected, and it is assumed that there are relatively ample communication resources in the satellite communication system 13 as a whole, therefore it is acceptable to allocate communication resources to the in-flight communication device 2F which has low connectivity and/or communication efficiency. If S4 is determined to be Yes, the altitude of the in-flight communication device 2F is within the altitude range for allowing connection of the communication satellite 131 (e.g. below the lower threshold of "8,000 m" or above the upper threshold of "12,000 m"), and this in-flight communication device 2F is expected to stay in the satellite communication cell 132 for a relatively long time, therefore it is acceptable to allocate communication resources to the in-flight communication device 2F similar to the ground communication device 2G.

If S3 and S4 are determined to be No, the processes proceed to S6 where the connection restriction unit 33 provided in the in-flight communication device 2F restricts the transmission of connection request from the in-flight communication device 2F determined to be the in-the-sky communication device 2F in S3 and S4 to the communication satellite 131. Thus, the connection restriction unit 33 restricts the connection of the in-flight communication device 2F with the communication satellite 131, when there is only one communication satellite 131 to which the in-flight communication device 2F can connect (No in S3), and when the altitude of the in-flight communication device 2F is outside the altitude range for allowing connection of the communication satellite 131 (No in S4 e.g. above the lower threshold of "8,000 m" and below the upper threshold of "12,000 m"). After a predetermined period of time has elapsed since S6, the processes return to S3, and the processes from S3 to S6 are repeated periodically (e.g. every 5 to 10 seconds) and end at S5.

In the second example, the in-the-sky communication device detection unit 31 and the connection restriction unit 33 are realized in the non-terrestrial network including the communication satellite 131 and the gateway 133. Since the non-terrestrial network is aware of the ephemeris information of the communication satellite 131 that constitutes itself, it is not necessary to provide the ephemeris information acquisition unit 32 in this example. The in-the-sky communication device detection unit 31 provided in the non-terrestrial network (e.g. the communication satellite 131 and/or the gateway 133), detects a communication device 2 whose signal propagation time with the communication satellite 131 is less than a predetermined value, as the in-the-sky communication device 2F. The signal for detecting the in-the-sky communication device 2F can be any signal communicated between the in-the-sky communication device 2F and the communication satellite 131. For example, the signal can be a message transmitted by the in-the-sky communication device 2F to the communication satellite 131 in a random access procedure to establish connection with the communication satellite 131.

Figure 4:
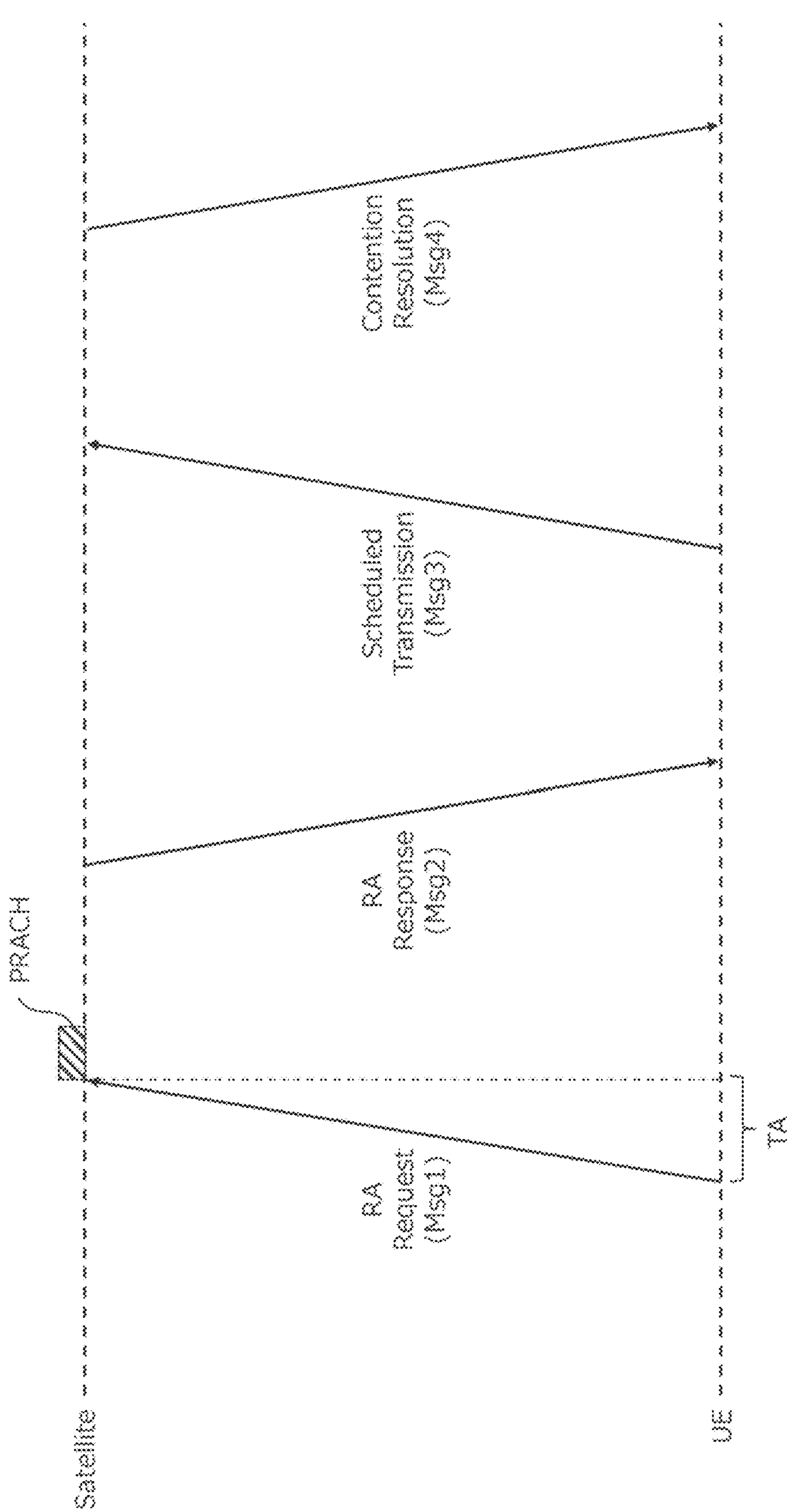
FIG. 4 schematically shows the random access procedure.

FIG. 4 schematically shows the contention based random access (CBRA) procedure between the communication device 2 (UE) and the communication satellite 131 (Satellite). The CBRA procedure is composed of four messages exchanged between the communication device 2 and the communication satellite 131. The first message (Msg1) is random access request (RA Request) sent from the communication device 2 to the communication satellite 131. The communication device 2 attempting random access to the communication satellite 131 to establish connection, selects any one random access preamble (hereinafter briefly referred to as preamble) from up to 64 predefined mutually orthogonal preambles that the communication satellite 131 can accept, and sends it in the first message to the communication satellite 131 over the physical random access channel (PRACH).

The second message (Msg2) is random access response (RA Response) sent from the communication satellite 131 to the communication device 2. The communication satellite 131 that has received the preamble from the communication device 2 through the physical random access channel, sends the random access response (hereinafter briefly referred to as response) to the communication device 2, if no other communication devices 2 have sent the same preamble to the communication satellite 131 over the same physical random access channel (if there is no preamble collision).

The communication device 2 that has received a normal response (the second message) from the communication satellite 131 transmits the third message (Msg3) to the communication satellite 131, following the timing information and/or scheduling permission (specifying the resource or physical uplink shared channel (PUSCH) in an uplink frame that can be used to transmit the third message) included in the second message. The third message includes the communication device identification information etc. of the communication device 2. Upon receipt of the third message, the communication satellite 131 identify or authenticate the communication device 2 based on the communication device identification information etc. in coordination with the core network, and send the notification of completion as the fourth message (Msg4) to the communication device 2. After the above series of four messages are successfully exchanged, the connection is established between the communication device 2 and the communication satellite 131.

In the random access procedure for the non-terrestrial network including the communication satellite 131, since the distance between the communication device 2 and the base station (communication satellite 131) is larger than the terrestrial network, the communication of each message is accompanied by a non-negligible (typically greater than 20 ms) propagation delay. In FIG. 4, the propagation delay or propagation time for the first message is illustrated as TA (Timing Advance). The propagation time TA for each message is recognized by the message receiver (the communication satellite 131 in case of the first message), for example, as the time difference between the time stamp (transmission time) given to the message by the message sender (the communication device 2 in case of the first message) and the time of reception of the message by the message receiver. For example, the communication satellite 131 that has received the first message can recognize the signal propagation time TA between itself and the communication device 2, as the time difference between the transmission time by the time stamp given to the first message and the time of reception of the first message by itself. The in-the-sky communication device detection unit 31 in the non-terrestrial network that has detected the propagation time TA as above, detects a communication device 2 whose propagation time TA is less than a predetermined value (e.g. 10 ms) as the in-the-sky communication device 2F.

The connection restriction unit 33 provided in the non-terrestrial network, may not transmit a response (e.g. the second message in the random access procedure) to the message (e.g. the first message in the random access procedure) received from the in-the-sky communication device 2F detected by the in-the-sky communication device detection unit 31, to this in-the-sky communication device 2F. In addition to or instead of the above, the connection restriction unit 33 provided in the non-terrestrial network, may transmit a connection restriction request for the communication satellite 131 to the in-the-sky communication device 2F detected by the in-the-sky communication device detection unit 31. The connection restriction request may prohibit or restrict the transmission of connection requests (retried random accesses) from the in-the-sky communication device 2F to the communication satellite 131, or may indicate a relatively long waiting time before the next connection request can be sent from the in-the-sky communication device 2F to the communication satellite 131 (e.g. a backoff indicator).

Thus, the connection restriction unit 33 provided in the non-terrestrial network, prohibits or restricts the connection between the communication satellite 131 and the in-the-sky communication device 2F. This can reduce the consumption of communication resources of the communication satellite 131 by the in-the-sky communication device 2F. However, in the second example, in order for the in-the-sky communication device detection unit 31 provided in the non-terrestrial network to detect the in-the-sky communication device 2F, it needs to calculate the propagation time based on the signal (e.g. the first message in the random access procedure) received from the in-the-sky communication device 2F. This consumes communication resources of the communication satellite 131. In contrast, in the first example described above, when the communication device 2 itself recognizes that it is the in-the-sky communication device 2F, it autonomously restricts the transmission of connection request to the communication satellite 131, thereby minimizing the consumption of communication resources of the communication satellite 131.

Figure 5:
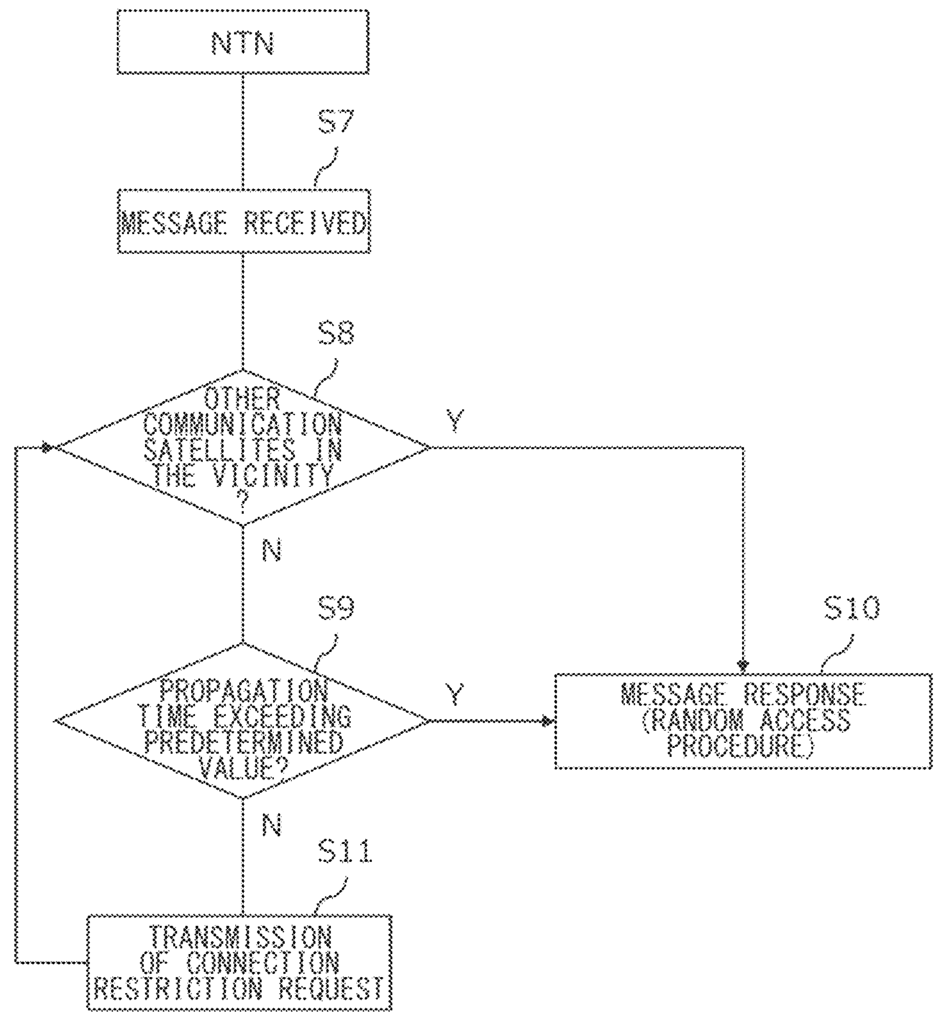
FIG. 5 is a flowchart showing example processes of the second example.

FIG. 5 is a flowchart showing an example of processes of the second example. The flowchart in FIG. 5 mainly shows the processes performed by the non-terrestrial network (NTN). In S7, the in-the-sky communication device detection unit 31 provided in the non-terrestrial network receives a message (e.g. the first message in the random access procedure) from the communication device 2 by the communication satellite 131. In S8, the in-the-sky communication device detection unit 31 provided in the non-terrestrial network determines whether or not there are other communication satellites 131 to which the communication device 2 that has sent the S7 message can connect, in the vicinity of the communication satellite 131 that has received the S7 message. Since the non-terrestrial network is aware of the locations and/or orbits of the communication satellites 131 belonging to itself or other affiliated non-terrestrial networks, the determination in S8 can be made in the non-terrestrial network. If S8 is determined to be No, the processes proceed to S9 where the in-the-sky communication device detection unit 31 provided in the non-terrestrial network determines whether or not the signal propagation time TA between the communication device 2 and the communication satellite 131, which is detected based on the message received in S7, exceeds a predetermined value (e.g. 10 ms).

If S8 and/or S9 is determined to be Yes, the processes proceed to S10 where the connection restriction unit 33 provided in the non-terrestrial network does not transmit the connection restriction request for the communication satellite 131 to the communication device 2, and the communication satellite 131 follows the normal random access procedure to transmit the second message to the communication device 2 as the response to the first message received in S7.

If S8 is determined to be Yes, there are multiple communication satellites 131 to which the communication device 2 that has sent the message in S7 can be connected, and it is assumed that there are relatively ample communication resources in the satellite communication system 13 as a whole, therefore it is acceptable to allocate communication resources to the in-flight communication device 2F etc. which has low connectivity and/or communication efficiency. If S9 is determined to be Yes, the signal propagation time TA between the communication device 2 that has sent the message in S7 and the communication satellite 131 exceeds a predetermined value (e.g. 10 ms), and this communication device 2 is expected to stay in the satellite communication cell 132 for a relatively long time, therefore it is acceptable to allocate communication resources to the communication device 2 (in-flight communication device 2F etc.) similar to the ground communication device 2G.

If S8 and S9 are determined to be No, the processes proceed to S11 where the connection restriction unit 33 provided in the non-terrestrial network transmits the connection restriction request for the communication satellite 131 to the communication device 2 determined to be the in-the-sky communication device 2F in S8 and S9. Thus, the connection restriction unit 33 restricts the connection of the communication device 2 (in-flight communication device 2F etc.) with the communication satellite 131, when there is only one communication satellite 131 to which the communication device 2 can connect (No in S8), and when the signal propagation time TA between the communication device 2 and the communication satellite 131 does not exceed a predetermined value (e.g. 10 ms) (No in S9). The connection restriction unit 33 does not send a response to the message received in S7 to the in-the-sky communication device 2F. After a predetermined period of time has elapsed since S11, the processes return to S8, and the processes from S8 to S11 are repeated periodically (e.g. every 5 to 10 seconds) and end at S10.

Figure 6:
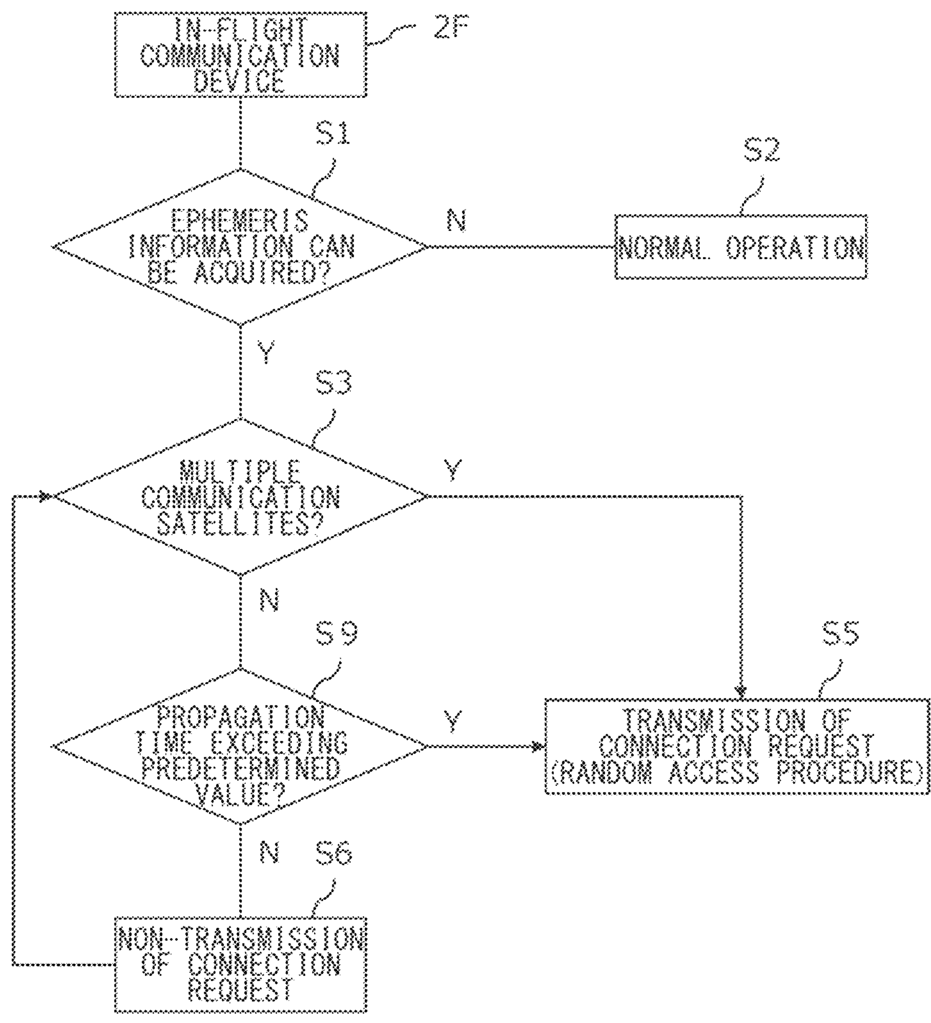
FIG. 6 is a flowchart showing example processes of the third example.

Note that the signal propagation time TA between the communication device 2 and the communication satellite 131 can be detected, not only on the non-terrestrial network side that has received the first message in the random access procedure as in the second example, but also on the communication device 2 side that has received the second message in the random access procedure and/or other signals from the communication satellite 131. Alternatively, the communication device 2 can estimate the relative distance and propagation time TA between itself and the communication satellite 131, based on its own position detected by the positioning sensor and the ephemeris information of the communication satellite 131 included in the broadcast information such as SIB transmitted from the communication satellite 131 etc. An example of processes based on the propagation time TA that can be recognized on the communication device 2 side is shown in FIG. 6 as the third example.

The third example is substantially a combination of part of the processes in the first example and part of the processes in the second example. Processes similar to those in each example are marked with the same signs, and duplicate explanations will be omitted. In the third example, the in-the-sky communication device detection unit 31, the ephemeris information acquisition unit 32, and the connection restriction unit 33 are realized in the in-the-sky communication device 2F.

The in-the-sky communication device detection unit 31, which is provided in the in-the-sky communication device 2F, estimates the propagation time TA between the in-the-sky communication device 2F and the communication satellite 131, based on the position of the in-the-sky communication device 2F detected by its own positioning sensor, and the ephemeris information of the communication satellite 131 included in the broadcast information such as SIB from the communication satellite 131 etc. acquired by the ephemeris information acquisition unit 32. It should be noted that the broadcast information such as SIB periodically or non-periodically transmitted by the non-terrestrial network may include information on the range of the propagation time TA for restricting or allowing connection. For example, if "10 ms or less" is specified in the broadcast information such as SIB as the range information of the propagation time TA for restricting connection, the in-the-sky communication device 2F as the in-the-sky communication device detection unit 31 that has received the range information, recognizes itself as the in-the-sky communication device 2F for the communication satellite 131, when its own detected propagation time TA is within the range information. As a result of the connection between the communication satellite 131 and the in-the-sky communication device 2F being restricted by the connection restriction unit 33, consumption of communication resources of the communication satellite 131 by the in-the-sky communication device 2F can be reduced.

In S1, the ephemeris information acquisition unit 32 provided in the in-flight communication device 2F determines whether or not the ephemeris information of the communication satellite 131 can be acquired. If S1 is determined to be No, the processes proceed to S2 where the in-flight communication device 2F performs the normal connection and/or communication operations similar to the ground communication device 2G. If S1 is determined to be Yes, the processes proceed to S3 where the ephemeris information acquisition unit 32 provided in the in-flight communication device 2F determines whether or not there are multiple communication satellites 131 to which the in-flight communication device 2F can connect. If S3 is determined to be No, the processes proceed to S9 where the in-the-sky communication device detection unit 31 provided in the in-flight communication device 2F determines whether or not the signal propagation time TA between the in-flight communication device 2F and the communication satellite 131 exceeds a predetermined value (e.g. 10 ms).

If S3 and/or S9 is determined to be Yes, the processes proceed to S5 where the connection restriction unit 33 provided in the in-flight communication device 2F does not restrict the connection between the communication satellite 131 and the in-flight communication device 2F, and the in-flight communication device 2F transmits the connection request to the communication satellite 131 according to the normal random access procedure. If S3 and S9 are determined to be No, the processes proceed to S6 where the connection restriction unit 33 provided in the in-flight communication device 2F restricts the transmission of connection request from the in-flight communication device 2F determined to be the in-the-sky communication device 2F in S3 and S9 to the communication satellite 131. After a predetermined period of time has elapsed since S6, the processes return to S3, and the processes S3, S9, S6 are repeated periodically (e.g. every 5 to 10 seconds) and end at S5.

The present disclosure has been described above based on embodiments. It is understood by those skilled in the art that the embodiments are exemplary and that various variations are possible in the combination of each component and/or each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure may be expressed as the following items.

1. A communication control apparatus comprising at least one processor that performs:
   by an in-the-sky communication device detection unit, detecting an in-the-sky communication device located above the ground; and
   by a connection restriction unit, restricting the connection of the in-the-sky communication device with a flying non-terrestrial base station that provides a non-terrestrial communication cell to a communication device.
2. The communication control apparatus according to item 1, wherein the in-the-sky communication device is a communication device in a flying aircraft.
3. The communication control apparatus according to item 1 or 2, wherein the in-the-sky communication device detection unit is provided in the in-the-sky communication device and detects itself as the in-the-sky communication device based on the altitude detected by a positioning sensor provided in the in-the-sky communication device.
4. The communication control apparatus according to item 3, wherein the in-the-sky communication device detection unit detects itself as the in-the-sky communication device, when the difference between the altitude information of the non-terrestrial base station notified to the in-the-sky communication device by a non-terrestrial network constituted by the non-terrestrial base station, and the altitude of the in-the-sky communication device detected by the positioning sensor, is less than a predetermined value.
5. The communication control apparatus according to item 3 or 4, wherein the connection restriction unit is provided in the in-the-sky communication device and restricts the transmission of connection request from the in-the-sky communication device to the non-terrestrial base station.
6. The communication control apparatus according to any of items 1 to 5, wherein the in-the-sky communication device detection unit is provided in a non-terrestrial network constituted by the non-terrestrial base station, and detects the in-the-sky communication device whose signal propagation time with the non-terrestrial base station is less than a predetermined value.
7. The communication control apparatus according to item 6, wherein the signal is a message transmitted by the in-the-sky communication device to the non-terrestrial base station in a random access procedure.
8. The communication control apparatus according to item 7, wherein the connection restriction unit is provided in the non-terrestrial network and does not transmit a response to the message to the in-the-sky communication device.
9. The communication control apparatus according to any of items 6 to 8, wherein the connection restriction unit is provided in the non-terrestrial network and transmits a connection restriction request for the non-terrestrial base station to the in-the-sky communication device.
10. The communication control apparatus according to any of items 1 to 7, wherein the connection restriction unit restricts the connection of the in-the-sky communication device with the non-terrestrial base station when there is only one non-terrestrial base station to which the in-the-sky communication device can connect.
11. The communication control apparatus according to any of items 1 to 10, wherein the non-terrestrial base station is a communication satellite flying in outer space.
12. A communication control method comprising:
   detecting an in-the-sky communication device located above the ground; and
   restricting the connection of the in-the-sky communication device with a flying non-terrestrial base station that provides a non-terrestrial communication cell to a communication device.
13. A computer-readable medium storing a communication control program causing a computer to perform:
   detecting an in-the-sky communication device located above the ground; and
   restricting the connection of the in-the-sky communication device with a flying non-terrestrial base station that provides a non-terrestrial communication cell to a communication device.

The present disclosure relates to communication control technology in communication system.

1 wireless communication system, 2 communication device, 2F in-the-sky communication device, 2G ground communication device, 3 communication control apparatus, 11 5G wireless communication system, 12 4G wireless communication system, 13 satellite communication system, 31 in-the-sky communication device detection unit, 32 ephemeris information acquisition unit, 33 connection restriction unit, 111 5G base station, 112 5G cell, 121 4G base station, 122 4G cell, 131 communication satellite, 132 satellite communication cell, 133 gateway.

What is claimed is:

1. A communication control apparatus comprising at least one processor that performs:
   by an in-the-sky communication device detection unit, detecting an in-the-sky communication device located above the ground; and
   by a connection restriction unit, restricting a connection of a flying non-terrestrial base station that provides a non-terrestrial communication cell to a communication device, with the in-the-sky communication device whose signal propagation time with the non-terrestrial base station is less than a predetermined value.

2. The communication control apparatus according to claim 1, wherein the in-the-sky communication device is a communication device in a flying aircraft.

3. The communication control apparatus according to claim 1, wherein the in-the-sky communication device detection unit detects itself as the in-the-sky communication device.

4. The communication control apparatus according to claim 3, wherein the connection restriction unit restricts a transmission of connection request from the in-the-sky communication device to the non-terrestrial base station.

5. The communication control apparatus according to claim 1, wherein the signal is a message transmitted by the in-the-sky communication device to the non-terrestrial base station in a random access procedure.

6. The communication control apparatus according to claim 5, wherein the connection restriction unit is provided in a non-terrestrial network constituted by the non-terrestrial base station and does not transmit a response to the message to the in-the-sky communication device.

7. The communication control apparatus according to claim 1, wherein the connection restriction unit is provided in a non-terrestrial network constituted by the non-terrestrial base station and transmits a connection restriction request for the non-terrestrial base station to the in-the-sky communication device.

8. The communication control apparatus according to claim 1, wherein the connection restriction unit restricts the connection of the in-the-sky communication device with the non-terrestrial base station when there is only one non-terrestrial base station to which the in-the-sky communication device can connect.

9. The communication control apparatus according to claim 1, wherein the non-terrestrial base station is a communication satellite flying in outer space.

10. A communication control method comprising:

detecting an in-the-sky communication device located above the ground; and restricting a connection of a flying non-terrestrial base station that provides a non-terrestrial communication cell to a communication device, with the in-the-sky communication device whose signal propagation time with the non-terrestrial base station is less than a predetermined value.

11. The communication control apparatus according to claim 1, wherein the in-the-sky communication device whose connection is restricted with the non-terrestrial base station belongs to a non-terrestrial network constituted by the non-terrestrial base station.

12. A communication control apparatus comprising at least one processor that performs:

by an in-the-sky communication device detection unit, detecting an in-the-sky communication device located above the ground based on its altitude detected by a positioning sensor; and by a connection restriction unit, restricting the connection of the in-the-sky communication device with a flying non-terrestrial base station that provides a non-terrestrial communication cell to a communication device, when the difference between the altitude of the non-terrestrial base station notified to the in-the-sky communication device by a non-terrestrial network constituted by the non-terrestrial base station, and the altitude of the in-the-sky communication device detected by the positioning sensor, is less than a predetermined value.

13. The communication control method according to claim 10, wherein the in-the-sky communication device whose connection is restricted with the non-terrestrial base station belongs to a non-terrestrial network constituted by the non-terrestrial base station.

14. The communication control method according to claim 10, wherein the in-the-sky communication device is a communication device in a flying aircraft.

15. The communication control method according to claim 10, wherein a communication device itself that performs the communication control method is detected as the in-the-sky communication device.

16. The communication control method according to claim 10, wherein the non-terrestrial base station is a communication satellite flying in outer space.

17. A communication control method performed by a communication device comprising:

detecting an in-the-sky communication device located above the ground based on its altitude detected by a positioning sensor; and restricting the connection of the in-the-sky communication device with a flying non-terrestrial base station that provides a non-terrestrial communication cell to a communication device, when the difference between the altitude of the non-terrestrial base station notified to the in-the-sky communication device by a non-terrestrial network constituted by the non-terrestrial base station, and the altitude of the in-the-sky communication device detected by the positioning sensor, is less than a predetermined value.

* * * * *